(12) United States Patent
Reimann et al.

(10) Patent No.: US 7,755,233 B2
(45) Date of Patent: Jul. 13, 2010

(54) ADJUSTMENTS DEVICE FOR A MOTOR VEHICLE SEAT WITH AN ELECTRIC MOTOR WITH A GEAR CONNECTED THERETO

(75) Inventors: Michael Reimann, Düsseldorf (DE); Wilfried Beneker, Leichlingen (DE); Burckhard Becker, Solingen (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 0 days.

(21) Appl. No.: 12/284,974

(22) Filed: Sep. 26, 2008

(65) Prior Publication Data

US 2009/0085420 A1 Apr. 2, 2009

(30) Foreign Application Priority Data

Sep. 27, 2007 (DE) .................. 10 2007 046 672
Oct. 18, 2007 (DE) .................. 10 2007 050 275

(51) Int. Cl.
*H02K 7/02* (2006.01)

(52) U.S. Cl. ........................... 310/75 R; 310/83
(58) Field of Classification Search .......... 310/83, 310/75 R, 68 R, 68 B
See application file for complete search history.

(56) References Cited

U.S. PATENT DOCUMENTS

| 4,922,170 | A | * | 5/1990 | Kawasaki et al. ............ 318/434 |
| 5,856,715 | A | * | 1/1999 | Peot et al. .................... 310/50 |
| 6,055,877 | A | * | 5/2000 | Welterlin et al. ............ 248/429 |
| 7,479,723 | B2 | * | 1/2009 | Dawsey et al. ........... 310/156.57 |
| 2002/0184760 | A1 | * | 12/2002 | Babin et al. .................. 29/888 |
| 2005/0231055 | A1 | * | 10/2005 | Rooke ......................... 310/103 |
| 2008/0073984 | A1 | * | 3/2008 | Down et al. .................... 310/53 |
| 2008/0194187 | A1 | * | 8/2008 | Bennett ........................ 451/353 |

* cited by examiner

*Primary Examiner*—Dang D Le
(74) *Attorney, Agent, or Firm*—John Lezdey & Assoc

(57) ABSTRACT

An adjustment device for a motorized vehicle seat has an electric motor and a gear connected to the electric motor. The electric motor has a nominal speed of more than 12,000 rpm, in particular of more than 15,000 rpm at nominal voltage.

12 Claims, 2 Drawing Sheets

ADJUSTMENTS DEVICE FOR A MOTOR VEHICLE SEAT WITH AN ELECTRIC MOTOR WITH A GEAR CONNECTED THERETO

FIELD OF THE INVENTION

The invention relates to an adjustment device for a motor vehicle seat with an electric motor and with a gear connected to said electric motor.

BACKGROUND OF THE INVENTION

Such type adjustment devices are state of the art. Beside the adjustment device equipped with an electric motor, there are also hand-operated adjustment devices, to which the invention is not directed though. Adjustment devices of the type mentioned herein above are known from U.S. Pat. No. 6,659,548 B1, US 2006/0260424 A1, DE 10 2005 059 693 A1, DE 10 2005 050 971 A1 and DE 10 2005 050 223 A1 for example.

A problem with the prior art adjustment devices is their weight. In particular the electric motor of an adjustment device contributes significantly to the overall weight of the adjustment device. The permanent magnets of an electric motor have a considerable mass and considerably participate in determining the overall weight of the motor. This applies in particular for modern magnet alloys as they are being increasingly used, such as neodymium.

Another problem beside the weight is the volume. Today, modern vehicle seats are equipped with many adjustment devices and place many different demands on the dimensions, the position of the passenger, the seat position often being desired to be as deep as possible and the like, which are to be met, so that it is difficult to accommodate the various adjustment devices within the package space available. Insofar, it is advantageous to provide the possibility of utilizing small adjustment devices as far as practicable. On the prior art adjustment devices, the electric motor as it is presently utilized occupies a considerable volume. It would be advantageous if volume, and space as a result thereof, could be saved.

SUMMARY OF THE INVENTION

Insofar, it is the object of the invention to further develop an adjustment device in such a manner that the overall weight and also the volume can be reduced. Accordingly, it is the object of the invention to further develop the adjustment device of the type mentioned herein above in such a manner that an electric motor can be utilized which is smaller in terms of volume and has a lower weight than presently usual in prior art.

In view of the adjustment device of the type mentioned herein above, the solution to this object is achieved in that the electric motor has a nominal speed of more than 12,000 rpm, more specifically of more than 15,000 rpm, at a nominal voltage.

In accordance with the invention, instead of using like before electric motors usually having a nominal speed of 3,000 to 4,000 rpm, a much higher rotating electric motor is used. This electric motor is not only smaller, it also has a lower weight. Midget motors are utilized as they are not yet utilized in the motor vehicle field, these midget motors typically turning at 12,000 rpm at least at the nominal voltage for which they have been permanently designed. They have a volume that is considerably smaller than half the volume of conventional electric motors for the same purpose. Generally, weight and package space are saved in this way.

Although such type midget motors need an additional gear stage, this stage can be built at low cost. By virtue of the high speed, the first reduction wheels, which are directly connected to the output shaft of the motor, can be configured to be of quite light weight; they can be made from plastic material for example. As compared to the presently utilized electric motors, an additional reduction in the range of approximately between 8 to 1 through 20 to 1 is needed; it can be realized favourably and/or at low cost with light-weight gear wheels which do not need much space. Generally, the gear becomes somewhat larger and slightly heavier, but the weight and volume savings of the electric motor are so considerable that these effects are no longer salient.

In a particularly preferred developed implementation, electric motor and gears are accommodated in one common housing. Preferably, the power electronics, meaning the control circuit, for the motor is also arranged in this housing. In this way, one has a drive unit of compact construction that can be utilized at several different sites and that provides a space and weight savings over prior art. Since the power electronics is only associated with one motor, wiring is easier. Preferably, there is provided a control unit via one of the bus systems currently utilized in the automotive field. As a result, only three feed lines are needed to the drive unit.

Preferably, the control circuit alternatively provides, in addition to the normal operating voltage, an overvoltage for the electric motor supply, the normal operating voltage applies in normal driving condition of the motor vehicle, which is defined by the fact that a crash sensor does not emit a signal; the overvoltage applies on the electric motor in the event of an accident after the sensor has emitted a signal informing about a critical driving condition. The overvoltage is at least 1.5 times, preferably at least twice, the normal operating voltage.

Especially small motors quickly go to very high rpm. Their low inertial torque is of advantage here. Although the overvoltage is supported thermally for a certain period of time only, this time is largely sufficient, in preparation of an accident occurrence, to bring part of a motor vehicle seat into a position that is particularly advantageous for the passenger.

The adjustment device is not limited to an adjustment device for motor vehicle seats; it also relates to such motor vehicle adjustment devices that are usually equipped with electric motors, such as the adjustment of a steering wheel, a window lifter, and so on.

BRIEF DESCRIPTION OF THE DRAWINGS

Other features and advantages of the invention will become more apparent upon reviewing the appended claims and the following non restrictive description of embodiments of the invention, given by way of example only with reference to the drawing. In said drawing:

DESCRIPTION OF THE PREFERRED EMBODIMENTS

Figure 1:
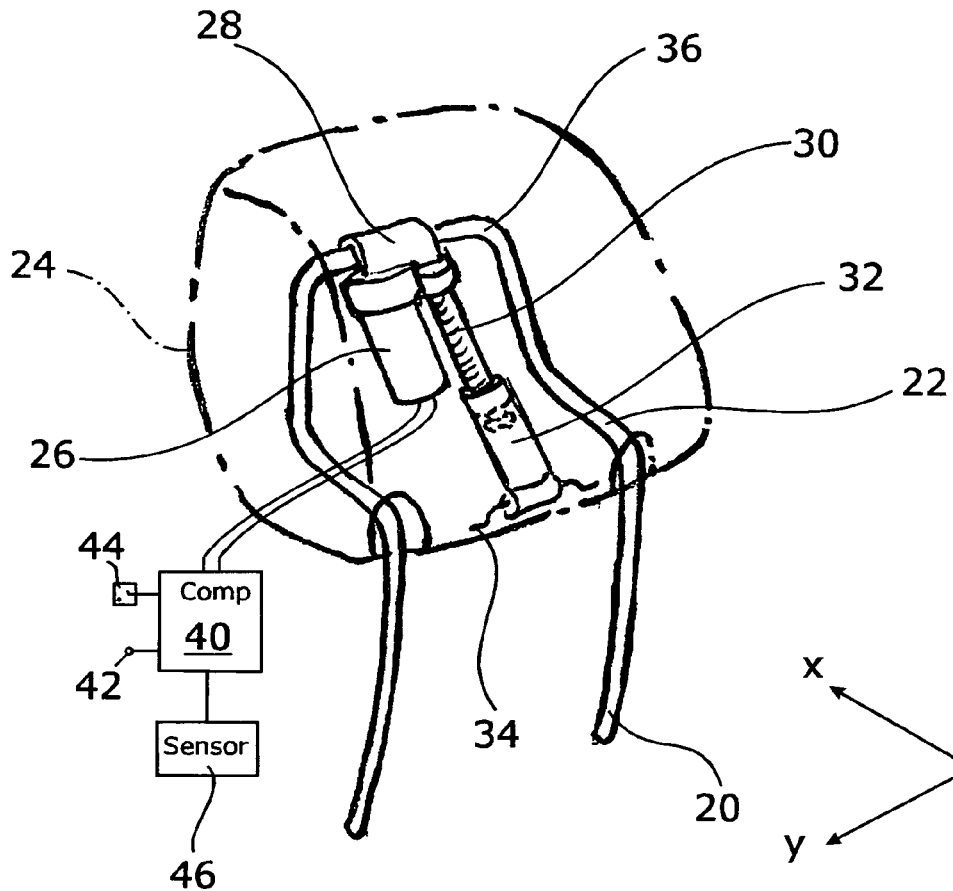
FIG. 1: shows a perspective illustration of a motor-adjustable head rest with an electric motor, a gear and a control circuit.

FIG. 1 shows a motor adjustable head rest. It has two bars 20, each of which forms an inclined region 22. Within this inclined region 22, a padding 24 is displaced forward in the x direction and at the same time upward in the z direction so that it can be brought in closer proximity to the head (not shown) of a passenger. The padding 24 is supported in a known way through a mechanical supporting frame (not shown). The adjustment device has an electric motor 26 and a gear 28 connected thereto.

In accordance with the invention, a midget motor is utilized as the electric motor 26. This midget motor differs in weight volume and rpm from a presently usually utilized electric motor 26 with about 3000 to 4000 rpm. The object of comparison is an actual standard motor as it is mounted in adjustment devices presently delivered by the applicant. In terms of weight, it is less than 50% its weight, preferably less than 25% the weight of the standard motor. In terms of volume, it occupies less than 30%, preferably less than 20%, of the space of an actual standard motor. The rpm is at least twice as high, preferably at least three times or four times the rpm of the standard motor. Preferably, it is more than 12,000 rpm, an rpm of more than 15,000 rpm and in particular of more than 17,000 rpm being preferred, at nominal voltage respectively.

As the mechanical parts, the adjustment device has a first adjustment part 30 that is configured to be a spindle here, and a second adjustment part 32 that is configured to be a spindle nut 54 in the instant case. When the spindle 30 is screwed into the spindle nut 32, the distance between a lower abutment 34 and an upper crossbeam 36 that is connected to the bars 20 shortens. As a result, the padding 24 is moved in the indicated direction.

The electric motor 26 is connected to a controller 40 through a line 38. The controller 40 is connected to the on-board electrical system 42 of the motor vehicle via a connecting line. Further, an operating switch 44 is associated with the controller 40, said switch allowing the user to actuate the normal adjustment function in normal driving condition. Finally, a sensor 46 is associated with the controller 40. In a known way, it is configured to be a crash sensor 46; a sensor 46 can be used as it is being used for enabling airbags. What is meant here is a sensor 46 that is responsive at certain acceleration, that more specifically also takes a certain acceleration curve into consideration. Other possibilities for the sensor 46 have already been discussed herein above.

Figure 2:
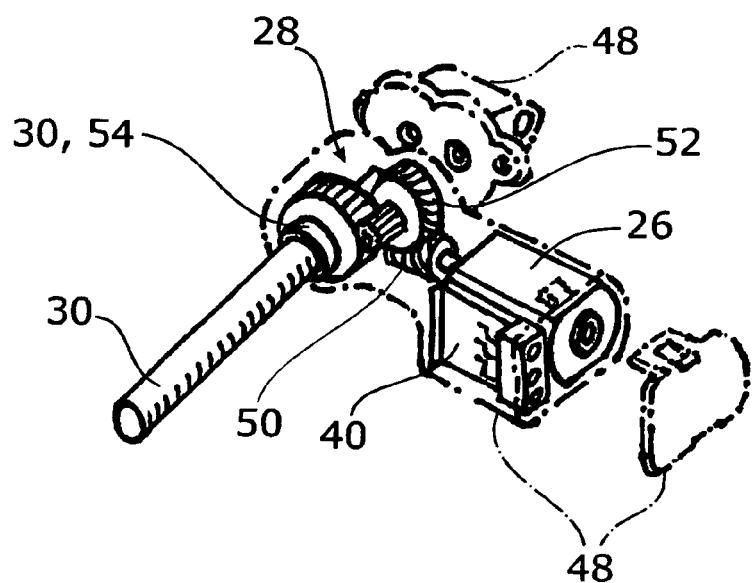
FIG. 2: shows a perspective illustration of the drive part of an adjustment device as it is utilized in a similar fashion in FIG. 1, FIG. 3: shows a schematic diagram of a controller with an electric motor.

As shown in FIG. 2, electric motor 26, gear 28 and also the controller 40 are accommodated in one common housing 48. The gear 28 has a worm 50 that is disposed on the output shaft of the motor and that meshes with a worm gear 52. This worm gear 52 in particular is made from plastic material; other gear wheels can be implemented in the same way. The gear 28 is devised such that the masses to be moved are as low as possible. In the implementation shown in FIG. 2, a spindle nut 54 is provided in the gear, said spindle nut rotating relative to the spindle 30; it is driven by the electric motor 26. As a result, the spindle 30 remains non rotatable. This also contributes in keeping low the masses to be moved.

The electric motor 26 has its own motor housing 56. It is possible to combine the motor housing 56 at least partially with the housing 48. The controller 40 is devised for the electric motor 26 only and must not supply other electric motors as this is the case in prior art. As a result, it can be configured to be quite small. It can be triggered through a bus (not shown). In the exemplary embodiment shown, the controller 40 is directly connected to the motor housing 56. As a result, its surface can be used for cooling component parts.

Figure 3:
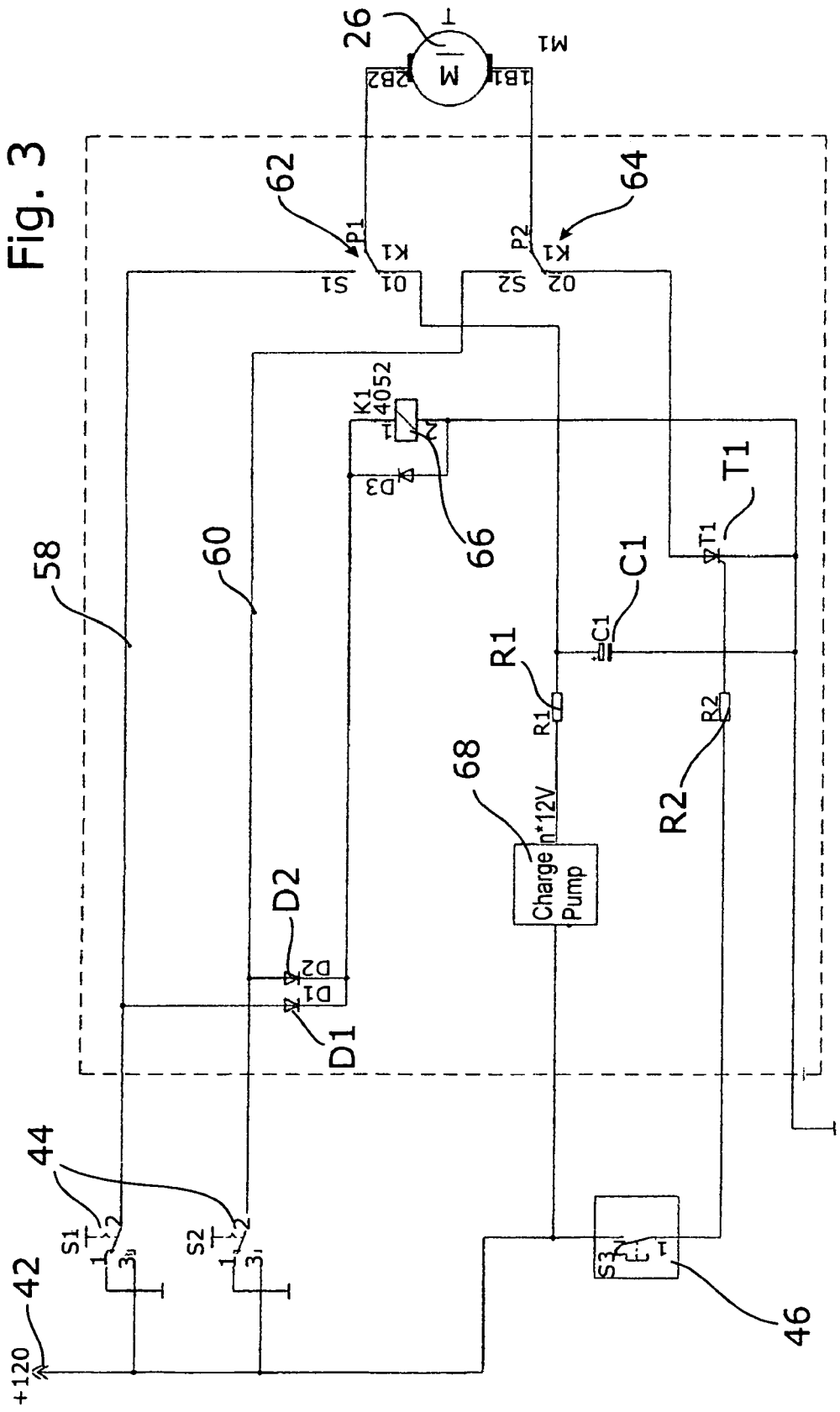

The electric diagram of the controller 40 can be seen in FIG. 3. At 42, the controller 40 is connected to the on-board electrical system 42. Through two operating switches 44, which are usually switched off, the voltage of the on-board electrical system, meaning in particular 12V, can be applied, according to choice, either to the upper line 58 or to the lower line 60, with the other line 60 or 58 remaining grounded. If the contacts 62, 64 of the relay 66 are in the upper position, a normal voltage supply of the electric motor 26 is possible. In FIG. 3, there is shown the position in which both the upper contact 62 and the lower contact 64 is not connected to the lines 58, 60. This condition is the condition of rest of the relay 66; in this condition, no current flows through the relay coil. In order to make an adjustment in a normal operating condition, one of the two operating switches 44 are actuated for one of the two lines 58, 60 to be at 12 volt. Then, the coil of relay 66 receives a voltage through the diode D1 or the diode D2, the coil is excited and the two contacts 62, 64 move upward from the position of rest; they are then in contact with the two lines 58, 60.

Herein after, the condition after an accident will be described: the voltage of the on-board electrical system of e.g., 12 V applies to a circuit 68 for multiplicating the voltage; it permanently produces an output voltage of n×12V. Through a protective resistance R1, this voltage applies to the charging capacitor C1 and charges it to n×12 V. The capacitor C1 has a value of some Farad, e.g., 2 F. As a result, n×12 V are permanently applied to the upper contact 62 and, as a result thereof, to the electric motor 26. The electric motor 26 however is not permanently connected to ground. In the ground line, there is inserted a fast switch T1, more specifically a thyristor or a switching transistor that is controlled by the sensor 46. It is faster than relay 66. If the sensor 46 is responsive, if, accordingly, the switch shown in the sensor 46 is closed, the switch T1 switches through and connects the lower pole of the electric motor 26 to ground. As a result, the voltage of n×12V, e.g., 48 V, applies to the electric motor 26; the electric motor 26 is operated in the strong overload mode of operation and actuates very fast the gear 28 and the parts connected downstream thereof.

The charge in the capacitor C1 is calculated such that the overvoltage only applies for a short period of time, such as 1 s, 0.5 s or even only 100 milliseconds. Then, the charge stored in the capacitor C1 has almost run down, the capacitor is discharged to a large extent and the electric motor 26 stops to rotate.

Nominal voltage and nominal speed respectively refer to the value indicated by the manufacturer of the motor for normal operation of the electric motor 26.

Accordingly, an electric motor in the sense of patent claim 1 is understood to refer to a small motor. It is further defined by the fact that it meets at least one of the following conditions:

a) the diameter of the substantially cylindrical motor housing is smaller than 30 mm, b) the length of the motor body is not longer than 50 mm, more specifically, the length of the substantially cylindrical motor body is not longer than 50 mm, or c) the weight is less than 150 g.

What is claimed:

1. An adjustment device for a motor vehicle seat which comprises a housing having an electric motor, a control circuit for said electric motor, and a gear connected to said electric motor mounted in said housing, wherein said electric motor has a nominal speed of more than 12,000 rpm, at nominal voltage, said control circuit has an overvoltage which is applied to the electric motor in the event of an accident, and a crash sensor which activates the overvoltage whereby said seat is adjusted.

2. The adjustment device of claim 1, wherein said electric motor has at most half as much weight as an electric motor which has a nominal speed of approximately 3,000 to 4,000 rpm for an adjustment device.

3. The adjustment device of claim 1, wherein said electric motor is electronically commuted.

4. The adjustment device of claim 1, wherein said electric motor has a volume that is at the most 30% the size of an electric motor for a comparable adjustment device which electric motor has a nominal speed of 3,000 to 4,000 rpm.

5. The adjustment device of claim 1, wherein said electric motor has a weight that is at most 30% of the weight of an electric motor for a comparable adjustment device which electric motor has a nominal speed of 3,000 to 4,000 rpm.

6. The adjustment device of claim 1, wherein said electric motor meets at least one of the following conditions:
   a) the diameter of a substantially cylindrical motor housing is smaller than 30 mm,
   b) the length of said motor body is not greater than 50 mm or
   c) the weight is less than 150 g.

7. The adjustment device of claim 1, wherein said electric motor has a nominal speed of more than 15,000 rpm at nominal voltage.

8. The adjustment device of claim 1, wherein said adjustment device comprises a control circuit.

9. The adjustment device of claim 1, wherein the length of a cylindrical motor body is not longer than 50 mm.

10. The adjustment device of claim 1 wherein said sensor is responsive to certain accelerations to enable airbags.

11. The adjustment device of claim 1 wherein said control circuit is connected to an on-board electrical system of said motor vehicle.

12. The adjustment device of claim 1 which is associated with a motor adjustable head rest of said seat.

* * * * *